United States Patent [19]

Takeuchi et al.

[11] 3,914,448

[45] Oct. 21, 1975

[54] PROCESS FOR PREPARING EGG NOODLES AND THE RESULTING PRODUCT

[75] Inventors: Tsuneo Takeuchi; Masaki Terada; Mitsumune Takatsu; Junichi Minami, all of Osaka; Shohei Otani, Hyogo, all of Japan

[73] Assignee: Nissin Shokuhin Kaisha, Ltd., Osaka, Japan

[22] Filed: Apr. 8, 1974

[21] Appl. No.: 459,185

Related U.S. Application Data

[63] Continuation-in-part of Ser. No. 225,321, Feb. 10, 1972, abandoned.

[52] U.S. Cl................................. 426/557; 426/47
[51] Int. Cl.²....................................... A23L 1/16
[58] Field of Search ............ 426/47, 158, 343, 346

[56] References Cited
UNITED STATES PATENTS
3,113,869   12/1963   Lee..................................... 426/158
3,260,606   7/1966   Azuma................................. 426/47

*Primary Examiner*—Raymond N. Jones
*Attorney, Agent, or Firm*—Armstrong, Nikaido & Wegner

[57] ABSTRACT

As improved egg noodle is provided which has a superior food value as compared to the conventional egg noodle, and which further is resistant to coagulation upon heating and does not suffer from the characteristic "egg odor" after prolonged heat treatment common to conventional egg noodles. The egg noodles of the invention are prepared by treating the egg, prior to incorporation with the flour, with a proteolytic enzyme. It has been discovered that when the egg noodles of the invention have a degradation degree of from about 1.0 to 10.0% and preferably 2.0 to 7.0%, the properties of resultant egg noodle are remarkably enhanced.

7 Claims, No Drawings

PROCESS FOR PREPARING EGG NOODLES AND THE RESULTING PRODUCT

CROSS REFERENCE TO RELATED APPLICATION

This application is a continuation-in-part of our copending U.S. application Ser. No. 225,321, filed Feb. 10, 1972, and now abandoned.

BACKGROUND OF THE INVENTION

The presence of egg in various wheat products, such as spaghetti, macaroni, and "instant noodles" has long been recognized both for the nutritional benefits derived from the inclusion of egg, as well as from the ground of taste. In view of the ever-decreasing supply of food relative to the world's population, the demand for economical foodstuffs which are both nutritious and palatable to the taste has become an area of increased concern.

The nutritional advantages derived from the inclusion of egg in food materials such as egg noodles has long been recognized. It is thus recognized that egg, when added to a wheat product such as spaghetti, macaroni or noodles, provides a stable carbon-nitrogen balance, and an increased efficiency of metastasis due to the vitamins and inorganic salts contained in the egg.

The flavor and taste value of the incorporation of egg into wheat products is well known. Thus, the improved flavor of egg noodles promotes the use of various wheat products in the diet.

Although egg noodles are important factors in the use of the world's supply of foodstuffs, there are certain natural disadvantages to egg noodles. For example, conventional wheat products such as spaghetti, macaroni and instant noodles are often subjected to heating at high temperature, often up to 100°C. The egg, incorporated into such wheat products, lends to coagulate during such heat treatment. Due to the coagulation of the egg, the wheat product requires a longer period of time after heating to restore the product to a palatable state. In addition, there is often generated the peculiar smell of egg as a result of the coagulation, making the wheat product unpalatable as a foodstuff.

In terms of nutritional value, although egg greatly adds to the foodstuff value of the wheat product, the rate of absorption of the egg into the animal system detracts from the overall nutritional value to be gained by the egg protein.

Representative of the prior art attempts to overcome the problems of the art is the work of Azuma, U.S. Pat. No. 3,260,606, issued July 12, 1966 (Class 99-Subclass 113). The Azuma disclosure has a vague, general reference which is inclusive of nooldes. However, the application of the Azuma work to egg noodles has not been found satisfactory due to various drawbacks encountered with the severe degradation of the egg protein by Azuma. Particularly, in Examples 1 and 2 of the Azuma patent, the decomposition degree is of such magnitude as to render any noodle products obtained therefrom to be incapable of roller molding. When a dried noodle product is made with a high degradation degree, for example, 20%, the noodle products not only cannot be made through conventional roller molding; furthermore, the noodle products with 20% degradation are very fragile, making such noodle products relatively undersirable, both from a standpoint of the housewife-ultimate user, as well as from the commercial standpoint of producing a salable product.

Accordingly, it is an object of the invention to provide an improved wheat product of enhanced value as a foodstuff.

A further object of the invention is to provide an improved wheat product resistant to coagulation upon heating and which can be roller-molded.

SUMMARY OF THE INVENTION

An improved egg noodle is provided wherein the egg, prior to incorporation with the flour to produce the egg noodle, has been treated with a proteolytic enzyme, the amount of degradation being between about 1.0 and 10.0%.

DETAILED DESCRIPTION OF THE INVENTION

An improved egg noodle is provided through the inclusion of a proteolytic enzyme so as to resist coagulation of the egg upon heating.

By the term "egg noodle" is contemplated foodstuffs which are made of wheat and egg, such egg noodles including spaghetti, macaroni, instant noodles and the like. As instant noodles are contemplated convenience foods, such as noodles which are gelatinized instant cooking noodles, which have been dehydrated by treatment with hot air or frying.

In order to obviate the problems caused by the often severe heat treatment to which egg noodles are subjected, the tendency of the egg noodles to coagulate during such heat treatments is retarded through the treatment of the egg with a proteolytic enzyme to effect hydrolysis of the egg protein. The egg noodle of the invention is therefore composed of protease-treated egg protein. As the protease breaks down the egg protein into simpler, more digestible protein units, the resultant egg noodle has better absorbability into the human system, and is not subject to coagulation upon heating, the egg protein having been already broken down through the protease treatment.

According to a preferred embodiment of the invention, the egg content of the egg noodles of the invention, measured as the solid content, is at least 5.5%.

As proteolytic enzymes contemplated in the process of the invention are contemplated those enzymes capable of effecting hydrolysis of the egg protein into simpler units. Examples of such proteolytic enzymes are heat resistant protease produced from Actinomycete and TAKA diastase; Asp oryzae.

In order to provide an improved egg product, it has been found that an "adhesive" should be added to the flour product to be made into the noodle. From about 8.05% to about 5% of the adhesive, based on the weight of the flour, should advantageously be incorporated into mixture prior to manufacture, particularly prior to roller molding the noodle. As an adhesive is meant substances such as alginic acid which, upon mixture with water, form a very viscous solution, whereby the viscosity of the foodstuff is increased. As representative adhesive agents may be mentioned, in addition to alginic acid, other polysaccharides such as pectin and proteins such as gluten and casein.

The following non-limitive examples serve to further illustrate the invention.

EXAMPLE 1

Treated Egg

Raw egg was treated with an enzyme to produce a treated egg of the invention according to the following manner: Protolytic enzyme, 2.2 × 10⁵(PU) $^{275}_{\gamma\ Tyr}{}^{CAS}_{B}$ (TAKA diastase; Asp oryzae) was added to 2.2 kilograms of raw egg with an adjusted pH value of 3.0. Stirring continued for 15 hours at 35°C to effect a hydrolytic reaction. After hydrolysis, the enzyme was inactivated by boiling for 30 minutes at 100°C, and the pH value was readjusted to 7.0 whereby the degree of degratation of the egg was from about 1.0 to 10.0%.

EXAMPLE 2

Spaghetti

Spaghetti dough was prepared by mixing 10 kg of semolina, 2.2 kg of the treated egg of Example 1, and 2.25 liters of water. The solids content of the semolina-egg mixture prior to addition to the water was 25%. After addition of the water, the final spaghetti dough contained 5.5% solids.

The resultant spaghetti dough was molded and dried by an ordinary spaghetti-making machine (100 kgs/cm²).

EXAMPLE 3

As a control sample, spaghetti dough was prepared as described in Example 2, except that 2.2 kgs of untreated egg was substituted for the treated egg of Example 1. The spaghetti was formed from the resultant dough in the manner described in Example 2.

EXAMPLE 4

Instant Noodles

A dough was prepared having the following ingredients: 10 kgs of wheat flour, 2.2 kgs of treated egg of Example 1, 4 g alginic acid, 8 g polysaccharide (tamarind), 5 g polyphosphoric acid, and 12 g soya bean albumin. The mixture had a solids content of 25%. After being mixed with 1.6 liter water to form a dough, the solids content of the egg was reduced to 5.5%.

The resultant dough was molded by rollers into noodle bands of 1.2 mm thickness and shreded into noodles having dimensions of 1.5 mm width and 300 mm length. The thus cut noodles were steamed at 100°C for 90 seconds, and thereafter immediately entered into a drying process for 30 minutes with dry air having a temperature of 90°C.

EXAMPLE 5

As a control sample, instant noodles were prepared according to the procedure of Example 4, except that 2.2 kgs of untreated egg was substituted for the treated egg of Example 1.

EXAMPLE 6

Treated Egg

Raw egg was treated with an enzyme to produce a treated egg of the invention according to the following manner: Raw whole egg, 2.8 kilograms, added with 1.4 liters of water and further with heat-resistant protease produced by Actinomycete 2.8 × 10⁵(PU) $^{275}_{\gamma\ Tyr}{}^{Cas}_{B}$, with pH value adjusted to 6.0, was subjected to hydrolytic reaction for 6 hours at 100°C.

Following the completion of the reaction, the enzyme was inactivated by boiling for 30 minutes at 100°C.

EXAMPLE 7

Gelatinized Instant Noodles

Gelatinized instant noodles which have dehydrated by frying were prepared in the following manner.

A dough was prepared from 10 kgs wheat flour, 3.3 kgs of the treated egg solution of Example 6, 10 g alginic acid, 160 g natural salt (NaCl), 100 g gluten and 0.40 liters water. The dough was worked up and the final solids content was 5.5%.

An instant cooking egg noodle was prepared from the resultant dough in the following manner. The dough, after having been molded by rollers into noodle bands of 1.8 mm thickness and further shreded into bands of 1.3 mm width and 300 mm length, was fried for 180 seconds in edible palm oil at 140°C to effect dehydration.

An instant egg noodle of the invention having excellent properties resulted from the above process.

EXAMPLE 8

As a control sample, the procedure of Example 7 was repeated, except that 2.2 kgs of untreated egg was substituted for the 3.3 kgs of the hydrolyzed egg solution.

EXAMPLE 9

The egg noodles of the invention and the control samples were tested under the same conditions. The egg noodles were each boiled, and the texture was measured by a Texturometer (Zenken Co., Ltd., Japan, with units of height/volt). The period of time necessary to restore the samples to a form suitable for eating was also measured. Each of the samples was also observed for any unpleasant "egg odor" characteristic of decayed egg products.

| Example | Restoration Time | Hardness | Unpleasant "Egg Odor" |
|---|---|---|---|
| 2 | 5–6 minutes | 0.63 | no |
| 3 | 9–10 minutes | 1.09 | yes |
| 4 | 5–6 minutes | 0.65 | no |
| 5 | 9–10 minutes | 1.09 | yes |
| 7 | 3 minutes | 0.12 | no |
| 8 | 6 minutes | 0.25 | no |

From the above experimental data, it can be seen that the restoration time of the egg noodle prepared in accordance with the present invention is roughly one-half that of the conventional egg noodle of the prior art. Furthermore, the hardness after treatment is considerably less for the treated egg noodle of the invention as compared to the conventional egg noodle of the prior art. A tendency of the untreated egg noodles to possess an unpleasant egg odor was observed in the control samples, whereas the treated egg noodles of the invention were not observed to possess the characteristic egg odor.

It has also been observed that the egg protein of the treated egg noodles of the invention is more rapidly and efficiently absorbed into the system of mammals. Therefore, the protein value of the egg noodles of the invention is superior to the conventional egg noodles of the prior art.

Further, for a substantial material of the noodle of this invention, wheat may be most popularly used as disclosed in the foregoing description, but other cereals for instance buck wheat and starch can be used as a matter of course.

EXAMPLE 10

In order to demonstrate the importance of a relatively low degree of degradation, several experiments were conducted with the results tabulated below:

Effects to Noodle by Decomposition Degrees of Egg
(when egg is added by 6% as a solid ingredient to noodle)

| Decomposition Degree | Control | 1 | 2 | 4 | 7 | 10 | 20 |
|---|---|---|---|---|---|---|---|
| Roller Molding | possible | | smoothly | | | possible | impossible |
| Dried Noodle | | | tough | | | a little fragile | fragile |
| Restration Period (minutes) | 6–7 | 3–4 | 2–3 | 2–3 | | | |
| Egg Noodle | | | | | | | |
| hardness | − | | + | ++ | | + | + |
| smoothness | − | | + | ++ | | + | + |
| taste | − | | + | ++ | | + | − |
| smell | − | | + | ++ | | + | + |
| solid melting | − | | | + | | ++ | +++ |

Note: − means "poor" or "low degree";
+ normal;
++ good or high degree;
+++ excellent.

"Degradation Degree":

Amino nitrogen ($NH_2$) of a 1000-times diluted liquid to which an enzyme is added, is measured by Yemm Cooking Method. Supposing an amount of amino nitrogen in non-degraded egg is Ao and that in the degraded egg is A, the degradation degree is A/Ao.

"Coagulation degree" is measured after heating at 80°C for 20 minutes and indicated with + and −. Bitterness is also indicated with + and −. (+: high degree, −: low)

Yemm Cooking Method:

Liquid A is 0.2 M-citrate buffer (pH 5.0 ± 0.1), liquid B is 250 ml of methylcellosolve containing 5 ml of 0.01 MKCN, liquid C is 50 ml of methylcellosolve containing 2.5 g of ninhydrin, and liquid D is a mixture of liquid B and C. 0.5 ml of liquid A and 1.2 ml of liquid D are added to 1 ml of a sample and boiled at 100°C for 15 minutes. After the product is cooled, 9 ml of 60% ethanol is added to it and mixed up; after that the absorbance (absorbancy or optical density) is measured at a wave length of 570 $\mu$.

What is claimed is:

1. In the process of roller molding an egg noodle from a mixture of flour and egg wherein said mixture is formed into a dough and passed through rollers and dried, the improvement which comprises utilizing as the egg source egg which has been treated with a proteolytic enzyme, whereby the degradation degree of said egg is from about 1.0 to about 10.0%.

2. The process of claim 1, wherein said degradation degree is from about 2.0 to 7.0%.

3. An egg noodle possessing an enhanced protein value and which has excellent hardness, smoothness, taste and which, upon heating, is substantially free of egg odor and is produced by the method claim 1.

4. An improved egg noodle of claim 3, wherein the degradation degree is about 2.0 to 7.0%.

5. An improved egg noodle of claim 3, which includes an adhesive agent.

6. The improved egg noodle of claim 5, wherein said adhesive agent is alginic acid.

7. The improved egg noodle of claim 3, wherein the egg comprises at least 5.5% of the egg noodle based upon the total solids content.

* * * * *